United States Patent
Kodaira et al.

(10) Patent No.: US 10,891,097 B2
(45) Date of Patent: Jan. 12, 2021

(54) RECEIVING DEVICE AND IMAGE FORMING APPARATUS

(71) Applicant: FUJI XEROX CO., LTD., Tokyo (JP)

(72) Inventors: Shunsuke Kodaira, Kanagawa (JP); Asako Takayama, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 157 days.

(21) Appl. No.: 15/939,456

(22) Filed: Mar. 29, 2018

(65) Prior Publication Data
US 2018/0300094 A1   Oct. 18, 2018

(30) Foreign Application Priority Data

Apr. 12, 2017  (JP) ................. 2017-079005

(51) Int. Cl.
| | |
|---|---|
| *G06F 3/12* | (2006.01) |
| *H04N 1/00* | (2006.01) |
| *G06F 3/042* | (2006.01) |
| *H04W 4/80* | (2018.01) |
| *G06F 3/0482* | (2013.01) |

(52) U.S. Cl.
CPC .......... *G06F 3/1292* (2013.01); *G06F 3/0421* (2013.01); *G06F 3/1207* (2013.01); *G06F 3/1259* (2013.01); *H04N 1/0044* (2013.01); *G06F 3/0482* (2013.01); *G06F 2203/04104* (2013.01); *H04W 4/80* (2018.02)

(58) Field of Classification Search
None
See application file for complete search history.

(56) References Cited

U.S. PATENT DOCUMENTS

| 10,148,833 | B2 | 12/2018 | Nakayama et al. | |
|---|---|---|---|---|
| 2005/0128396 | A1* | 6/2005 | Tsuchiya | G02F 1/133512 349/123 |
| 2008/0074334 | A1* | 3/2008 | Kang | G02F 1/13452 343/702 |
| 2015/0331649 | A1* | 11/2015 | Kadota | H04W 4/80 358/1.13 |

FOREIGN PATENT DOCUMENTS

| JP | 2016-221765 A | 12/2016 |
|---|---|---|
| WO | 2016/190425 A1 | 12/2016 |

OTHER PUBLICATIONS

Sep. 23, 2020 Office Action issued in Japanese Patent Application No. 2017-079005.

* cited by examiner

*Primary Examiner* — Frantz Bataille
(74) *Attorney, Agent, or Firm* — Oliff PLC

(57) ABSTRACT

A receiving device includes a display, a communication unit, and a protrusion portion. The display displays an image and receives an operation corresponding to the image in such a manner that a user comes into contact with the image. The communication unit communicates with a wireless communication apparatus performing near-field wireless communication. The protrusion portion is disposed at least between the display and the communication unit and protrudes from a surface on which the display is provided.

15 Claims, 11 Drawing Sheets

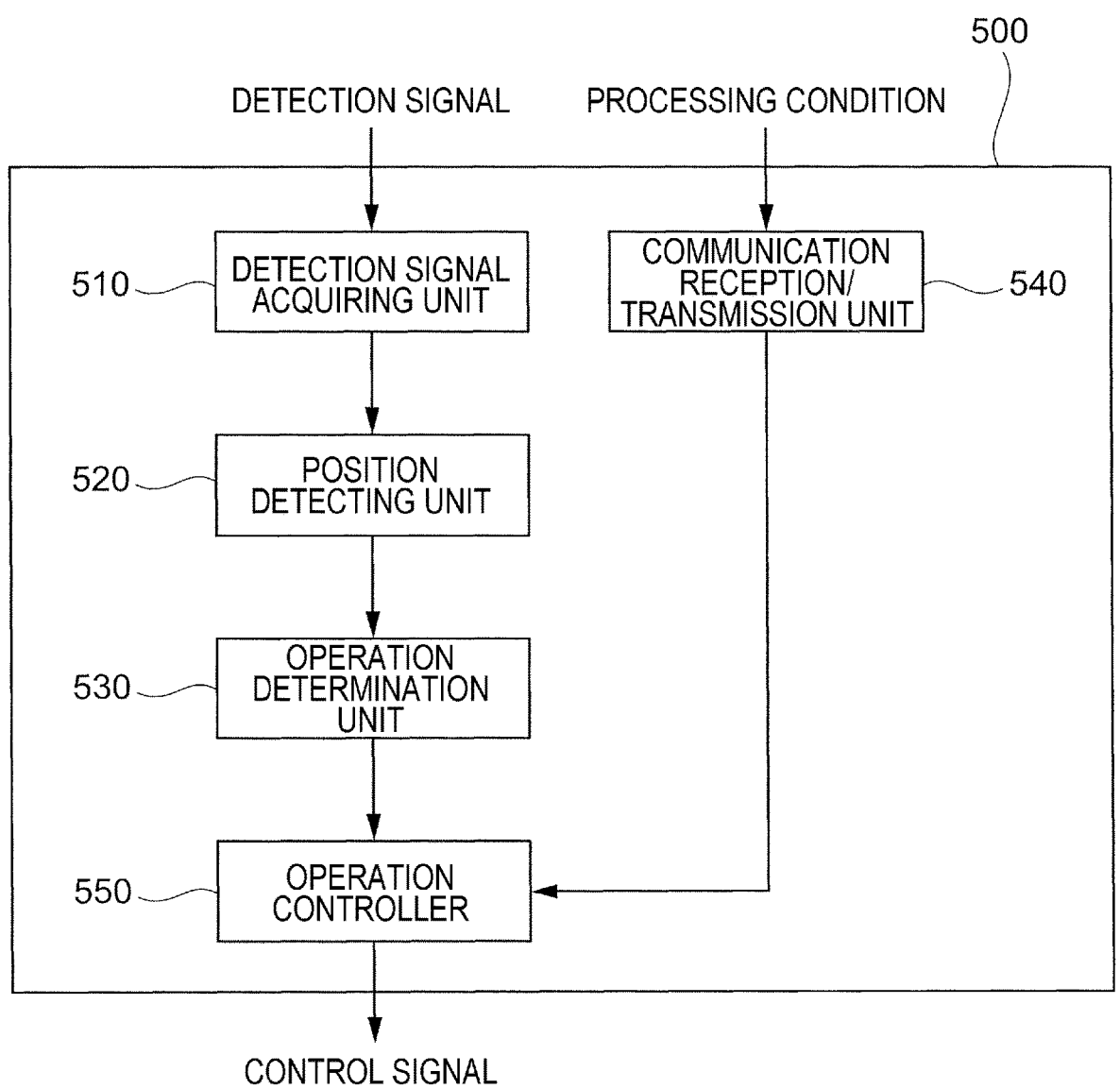

RECEIVING DEVICE AND IMAGE FORMING APPARATUS

CROSS-REFERENCE TO RELATED APPLICATIONS

This application is based on and claims priority under 35 USC 119 from Japanese Patent Application No. 2017-079005 filed Apr. 12, 2017.

BACKGROUND

(i) Technical Field

The present invention relates to a receiving device and an image forming apparatus.

(ii) Related Art

To provide an input unit for inputting information for operating an apparatus, hardware keys that are physical keys, such as buttons and switches, and software keys that are keys displayed on a display through software control may be disposed in a user interface.

In contrast, a communication unit may be provided for a user interface recently. Information for operating an apparatus, or the like is set in advance in a wireless communication apparatus such as a terminal apparatus. The communication unit performs near-field wireless communication (near field communication (NFC)) with the wireless communication apparatus so as to receive input of the information that is set in the wireless communication apparatus.

SUMMARY

According to an aspect of the invention, there is provided a receiving device including a display, a communication unit, and a protrusion portion. The display displays an image and receives an operation corresponding to the image in such a manner that a user comes into contact with the image. The communication unit communicates with a wireless communication apparatus performing near-field wireless communication. The protrusion portion is disposed at least between the display and the communication unit and protrudes from a surface on which the display is provided.

BRIEF DESCRIPTION OF THE DRAWINGS

Exemplary embodiments of the present invention will be described in detail based on the following figures, wherein:

FIG. 10 is a block diagram illustrating an exemplary functional configuration of a control device.

DETAILED DESCRIPTION

Referring to the attached drawings, exemplary embodiments will be described in detail.

Description about the Overall Configuration of an Image Forming Apparatus 1

Figure 1:
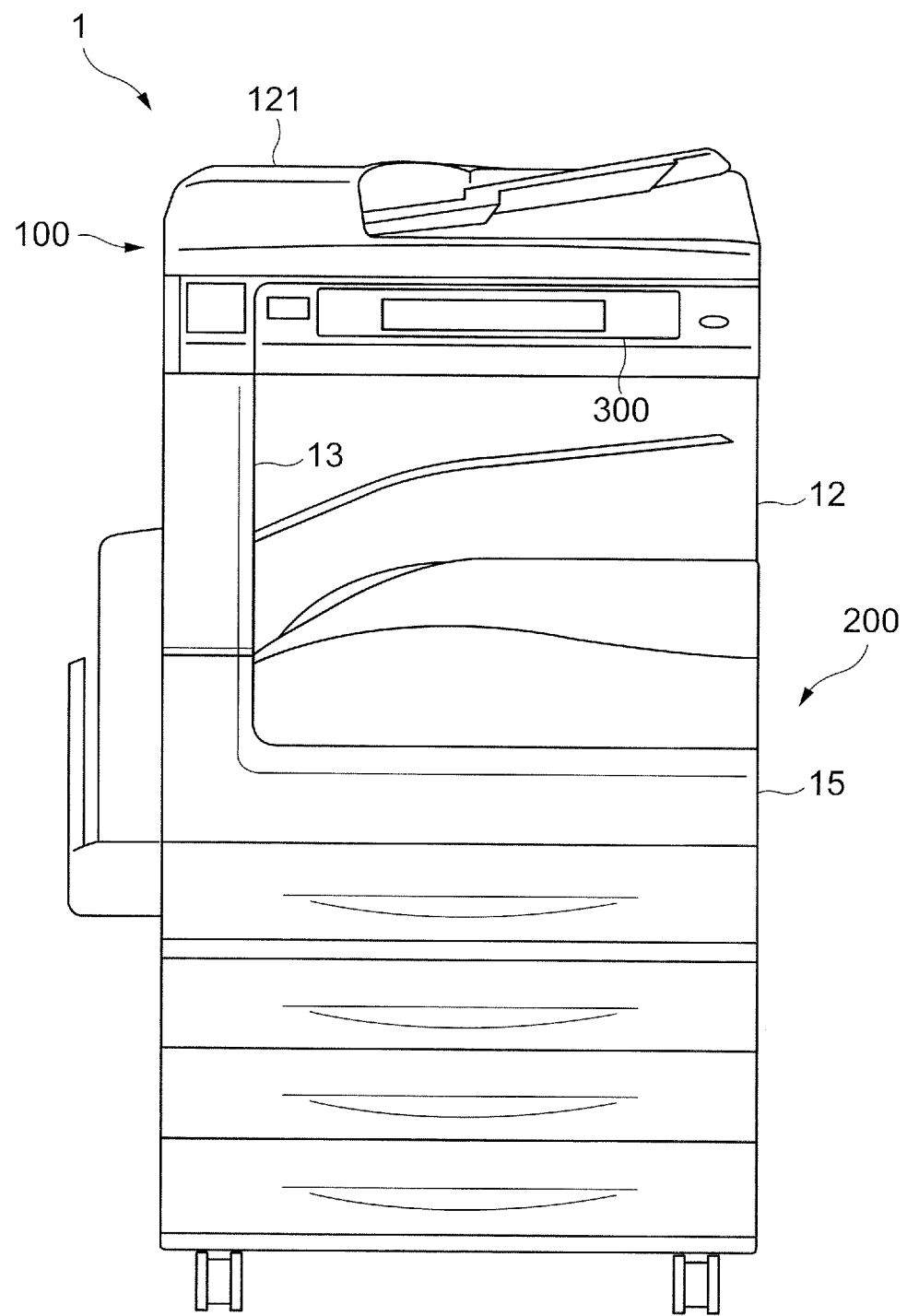
FIG. 1 is an external view of an image forming apparatus according to an exemplary embodiment.
Figure 2:
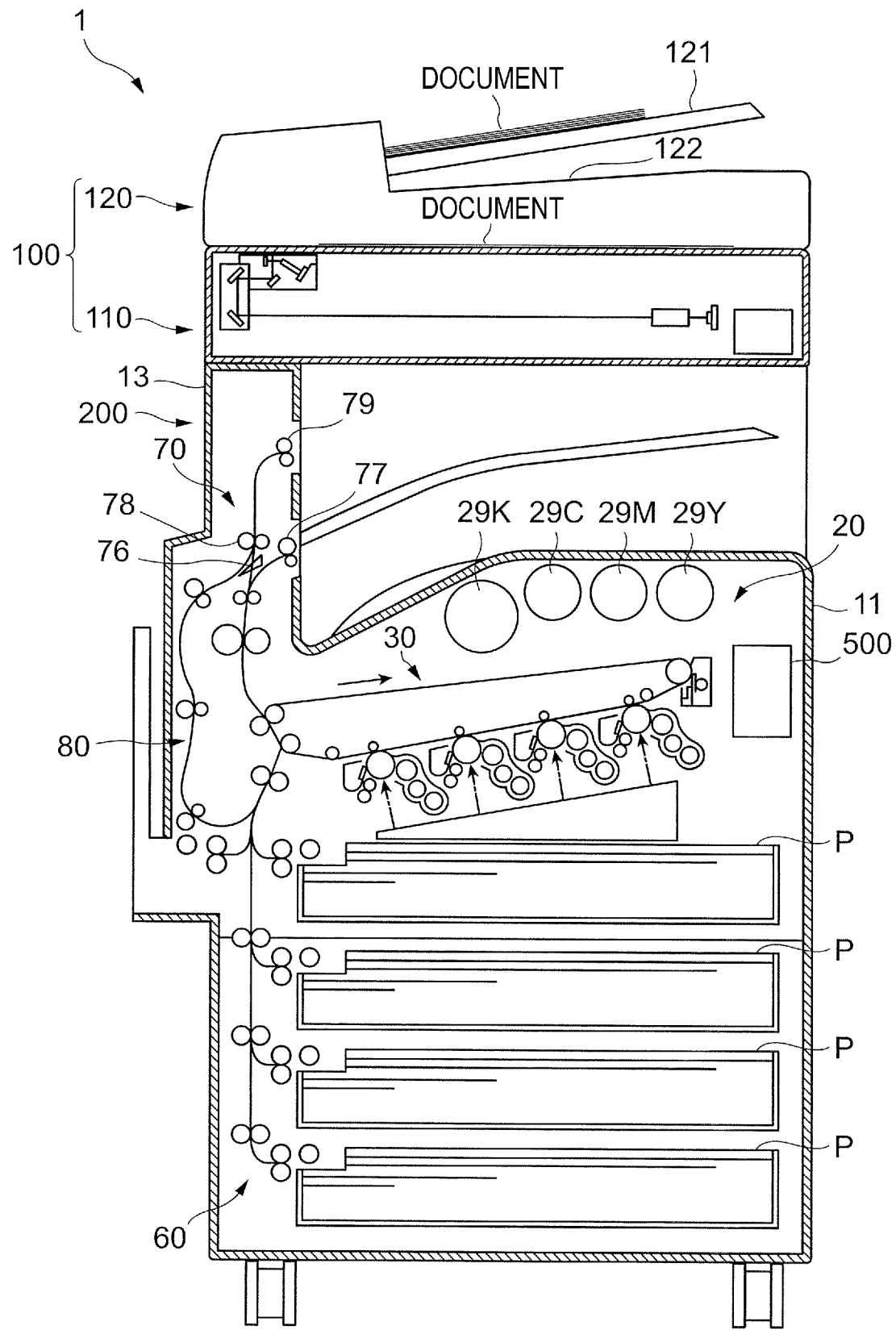
FIG. 2 is a diagram illustrating the internal configuration of the image forming apparatus according to the exemplary embodiment.

FIG. 1 is an external view of an image forming apparatus 1 according to an exemplary embodiment. FIG. 2 is a diagram illustrating the internal configuration of the image forming apparatus 1 according to the present exemplary embodiment.

The image forming apparatus 1 includes an image reading apparatus 100 that reads a document image, and an image recording apparatus 200 that records an image on recording material (may be hereinafter referred to as a "sheet" as a typical object). The image forming apparatus 1 also includes a user interface (UI) 300 that receives input of operations from a user and that displays various types of information to a user. The image forming apparatus 1 further includes a control device 500 that controls the operation of the entire image forming apparatus 1.

The image reading apparatus 100 is disposed in an upper portion of the image forming apparatus 1. The image recording apparatus 200 is disposed below the image reading apparatus 100, and includes the control device 500. The user interface 300 is disposed on the front side of an upper portion of the image forming apparatus 1, that is, on the front side of an image reading unit 110 of the image reading apparatus 100, which is described below.

The image reading apparatus 100 includes the image reading unit 110 that reads a document image and a document conveying unit 120 that conveys a document to the image reading unit 110. The document conveying unit 120 is disposed in an upper portion of the image reading apparatus 100. The image reading unit 110 is disposed in a lower portion of the image reading apparatus 100.

The document conveying unit 120 includes a document holding unit 121 that holds a document and a document discharging unit 122 that discharges a document having been conveyed from the document holding unit 121. The document conveying unit 120 conveys a document from the document holding unit 121 to the document discharging unit 122. The document conveying unit 120 is also called an auto document feeder (ADF).

The image recording apparatus 200 includes an image forming unit 20, a sheet supply unit 60, a sheet discharging unit 70, and a reverse conveying unit 80. The image forming unit 20 forms an image on a sheet P. The sheet supply unit 60 supplies a sheet P to the image forming unit 20. The sheet discharging unit 70 discharges a sheet P on which the image forming unit 20 has formed an image. The reverse conveying unit 80 reverses a sheet P upside down, on one side of which the image forming unit 20 has formed an image, and conveys the sheet P to the image forming unit 20 again.

The image recording apparatus 200 includes an apparatus body frame 11 and an apparatus housing 12. The apparatus body frame 11 supports the image forming unit 20, the sheet supply unit 60, the sheet discharging unit 70, the reverse conveying unit 80, and the control device 500 directly or indirectly. The apparatus housing 12 is attached to the apparatus body frame 11 so as to form the outer surfaces of the image forming apparatus 1.

The apparatus body frame 11 includes a reading apparatus supporting unit 13 in which a switching gate 76, a first discharge roller 77, a conveyance roller 78, a second discharge roller 79, and the like are provided at one end, in the horizontal direction, of the image forming apparatus 1. The reading apparatus supporting unit 13 also extends in the vertical direction and supports the image reading apparatus 100. The reading apparatus supporting unit 13 supports the image reading apparatus 100 in cooperation with a back-side portion of the apparatus body frame 11.

The image recording apparatus 200 includes a front cover 15 that is provided, as a part of the apparatus housing 12, on the front side of the image forming unit 20, and that is mounted so as to be openable in relation to the apparatus body frame 11.

A user opens the front cover 15 so that an intermediate transfer unit 30 and toner cartridges 29Y, 29M, 29C, and 29K in the image forming unit 20 may be replaced with new ones.

The user interface 300 is an exemplary receiving unit (receiving device) that receives a user instruction for the image forming apparatus 1, and includes a light detecting unit and a display, which are described in detail below. The user interface 300 provides various types of information to a user through a screen displayed on the display. When the user performs an operation on the display, the light detecting unit detects the operation. As a result, the user may input an instruction for the image forming apparatus 1.

Description about Operations of the Image Forming Apparatus 1

The image forming apparatus 1 having the above-described configuration operates as follows.

For example, a user may use the image forming apparatus 1 to copy a document. That is, on the basis of image data of a document that is read by the image reading apparatus 100, the image recording apparatus 200 may form an image on a sheet P so that the document is copied. In addition, a user may transmit, to the image forming apparatus 1, a print job from a personal computer (PC) or the like (not illustrated) connected to a communication line so that printing is performed. That is, a print job may be received through the communication line. On the basis of image data included in the print job, the image recording apparatus 200 may form an image on a sheet P so that printing is performed. Further, a user may perform facsimile transmission/reception. That is, image data of a document that is read by the image reading apparatus 100 may be transmitted through a communication line. In addition, a user may store image data of a document. That is, image data of a document may be stored in the image forming apparatus 1 or a PC connected to a communication line.

Description about the User Interface 300

First Exemplary Embodiment

A first exemplary embodiment will be described.

Figure 3A:
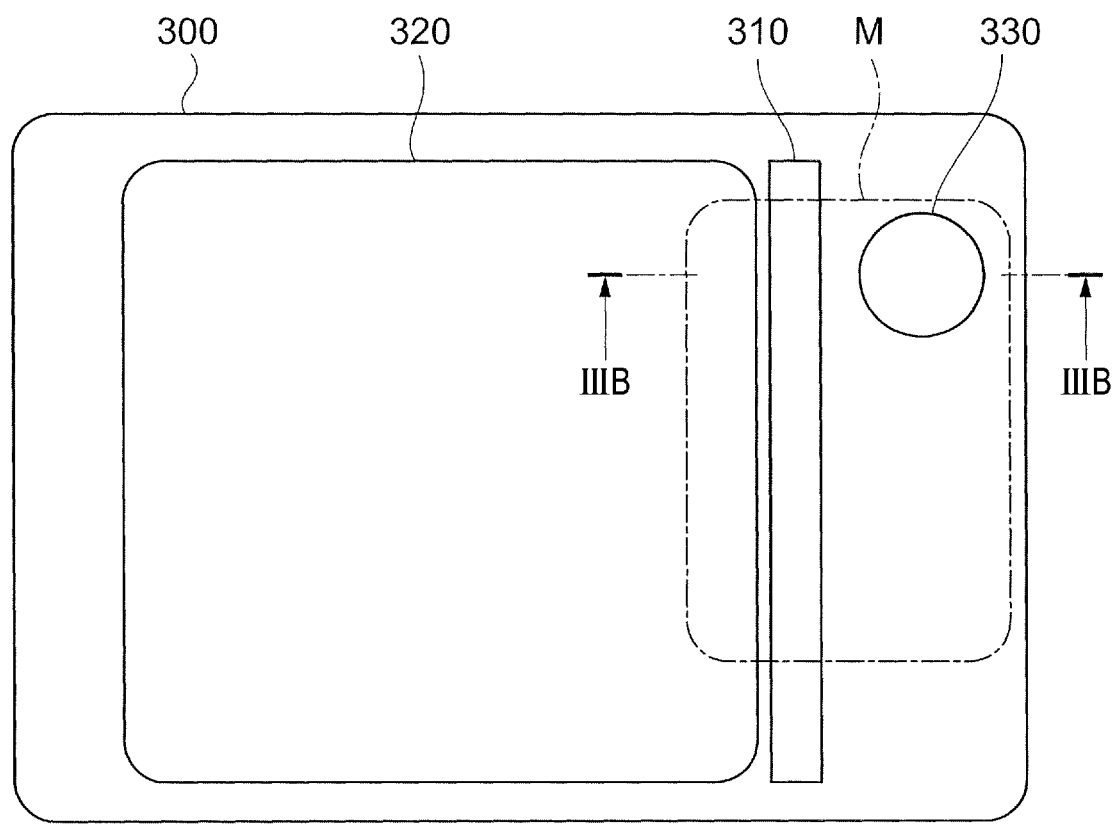
FIG. 3A is a diagram illustrating a user interface according to a first exemplary embodiment.
Figure 3B:
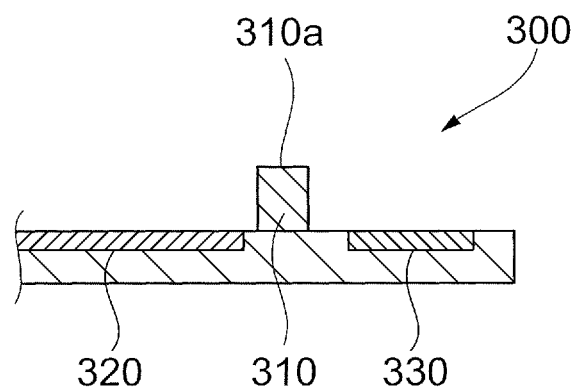
FIG. 3B is a IIIB-IIIB sectional view of the user interface illustrated in FIG. 3A.

FIG. 3A is a diagram illustrating a user interface 300 according to the first exemplary embodiment. FIG. 3A illustrates a case in which the user interface 300 is viewed from above. FIG. 3B is a IIIB-IIIB sectional view of the user interface 300 illustrated in FIG. 3A.

As illustrated in FIG. 3A, the user interface 300 includes a light detecting unit 310 that optically detects a detection target, a display 320 that displays an image, and a communication unit 330 that performs wireless communication.

The light detecting unit 310 which is also called, for example, an optical sensing bar detects the position of a detection target. When a user is to operate the user interface 300, for example, in such a manner that a touch operation is performed by using their finger, the light detecting unit 310 detects the user's finger as a detection target. The light detecting unit 310 may detect an object other than a user's finger as long as the object is used to touch the user interface 300. Thus, a detection target may be, for example, a touch pen.

Figure 4:
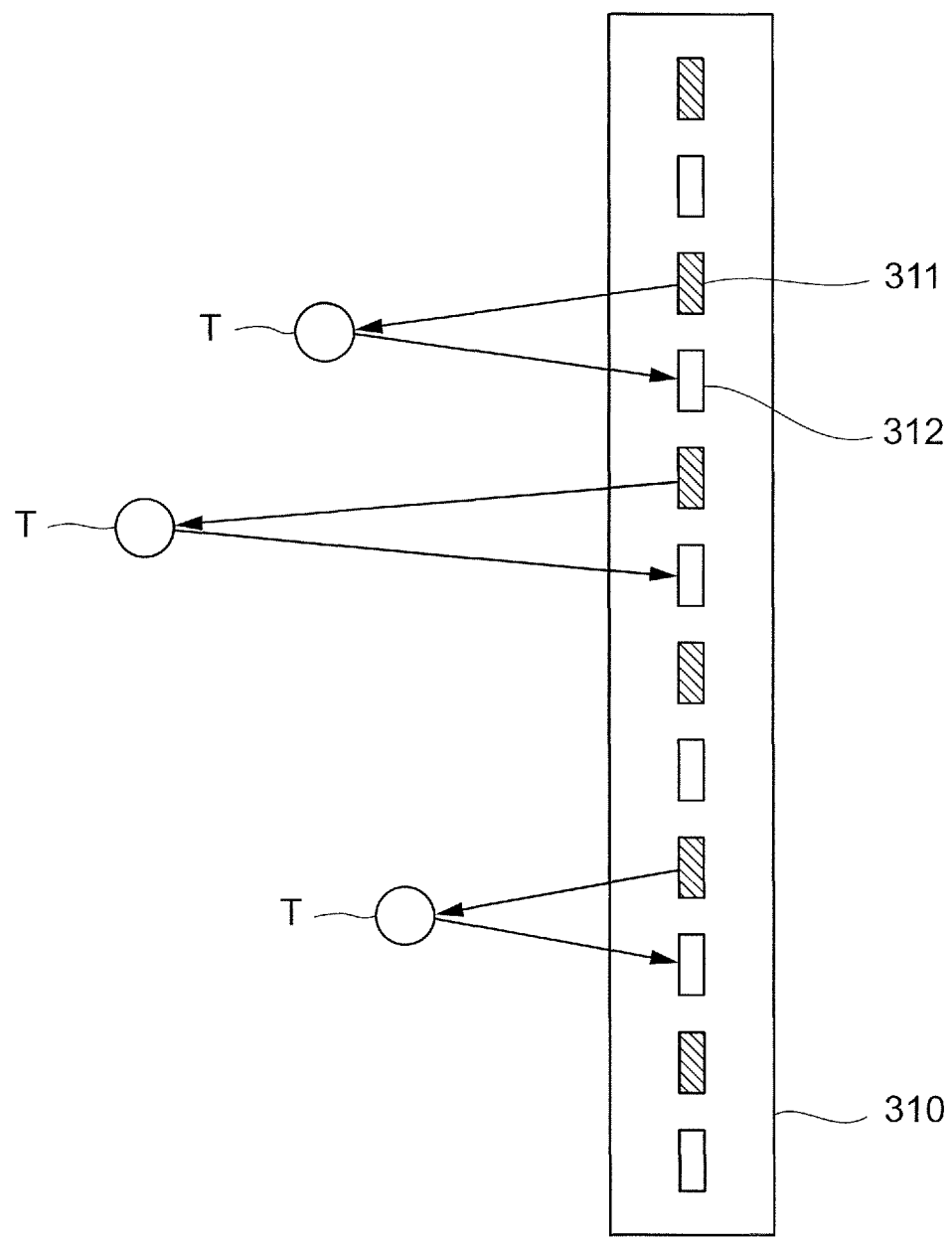
FIG. 4 is a diagram describing how a light detecting unit detects a detection target.

FIG. 4 is a diagram describing how the light detecting unit 310 detects a detection target T.

As illustrated in FIG. 4, the light detecting unit 310 includes light emitting units 311 that emit light and light receiving units 312 that receive light.

Each of the light emitting units 311 includes a light emitting diode (LED), and emits light such as infrared rays.

Each of the light receiving units 312 includes a photodiode (PD), and receives reflected light from a detection target T. The light receiving unit 312 outputs a detection signal in accordance with the reflected light.

As illustrated in FIG. 4, the light emitting units 311 and the light receiving units 312 are alternately arranged in a line.

In this configuration, each of the light receiving units 312 receives reflected light produced when light emitted from the corresponding one of the light emitting units 311 is reflected from a detection target T. Thus, the light detecting unit 310 may detect the position of the detection target T that is present on or above the display 320. To put it another way, the light detecting unit 310 may detect the two-dimensional position of a detection target T, which is a position specified in the vertical and horizontal directions. That is, the position of a detection target T in the vertical direction in FIG. 4 may be specified by determining which light receiving unit 312 has detected reflected light. The position of a detection target T in the horizontal direction in FIG. 4 may be specified by using the intensity of light received by the light receiving unit 312. That is, the closer a detection target T is from the light detecting unit 310, the higher the intensity of light received by a light receiving unit 312 is. In contrast, the farther a detection target T is from the light detecting unit 310, the lower the intensity of light received by a light receiving unit 312 is. Therefore, by using the intensity of light received by a light receiving unit 312, the distance between the light detecting unit 310 and a detection target T may be determined. Thus, the position of the detection target T in the horizontal direction in FIG. 4 may be specified. Even when multiple detection targets T are present, the light detecting unit 310 may detect the detection targets T individually. This enables detection of so-called multi-touch operation.

As illustrated in FIG. 3B, the light detecting unit 310 includes a protrusion portion 310a that protrudes from the surface on which the display 320 of the user interface 300 is provided. In the protrusion portion 310a, the light emitting units 311 and the light receiving units 312 illustrated in FIG. 4 are arranged. When a light ray, among light rays emitted from a light emitting unit 311, traveling along the surface on which the display 320 of the user interface 300 is provided hits a detection target T, the ray is reflected, forming reflected light. A light ray, among the reflected light rays from the detection target T, traveling along the surface on which the display 320 is provided is received by a light receiving unit 312.

The display 320 which is, for example, a liquid crystal panel displays information about the image forming apparatus 1 as an image, and receives an operation corresponding to the image when a user comes into contact with the image. The expression "contact" is not limited to a case in which the display 320 is actually touched by a detection target T. That is, as a result of a detection target T coming close to the display 320, even when the display 320 is not actually touched, the light detecting unit 310 may detect reflected light from the detection target T. This may result in determination that the detection target T has come into contact with the display 320. Therefore, in the exemplary embodiment, "contact" encompasses not only a case in which a user actually touches the display 320 by using a detection target T, but also a case in which, as a result of a detection target T coming close to the display 320, the detection target T is detected.

As illustrated in FIG. 3A, the display 320 is rectangular. A single light detecting unit 310 is disposed along one side of the display 320. In this example, the light detecting unit 310 is disposed along the right side of the display 320.

Figure 5:
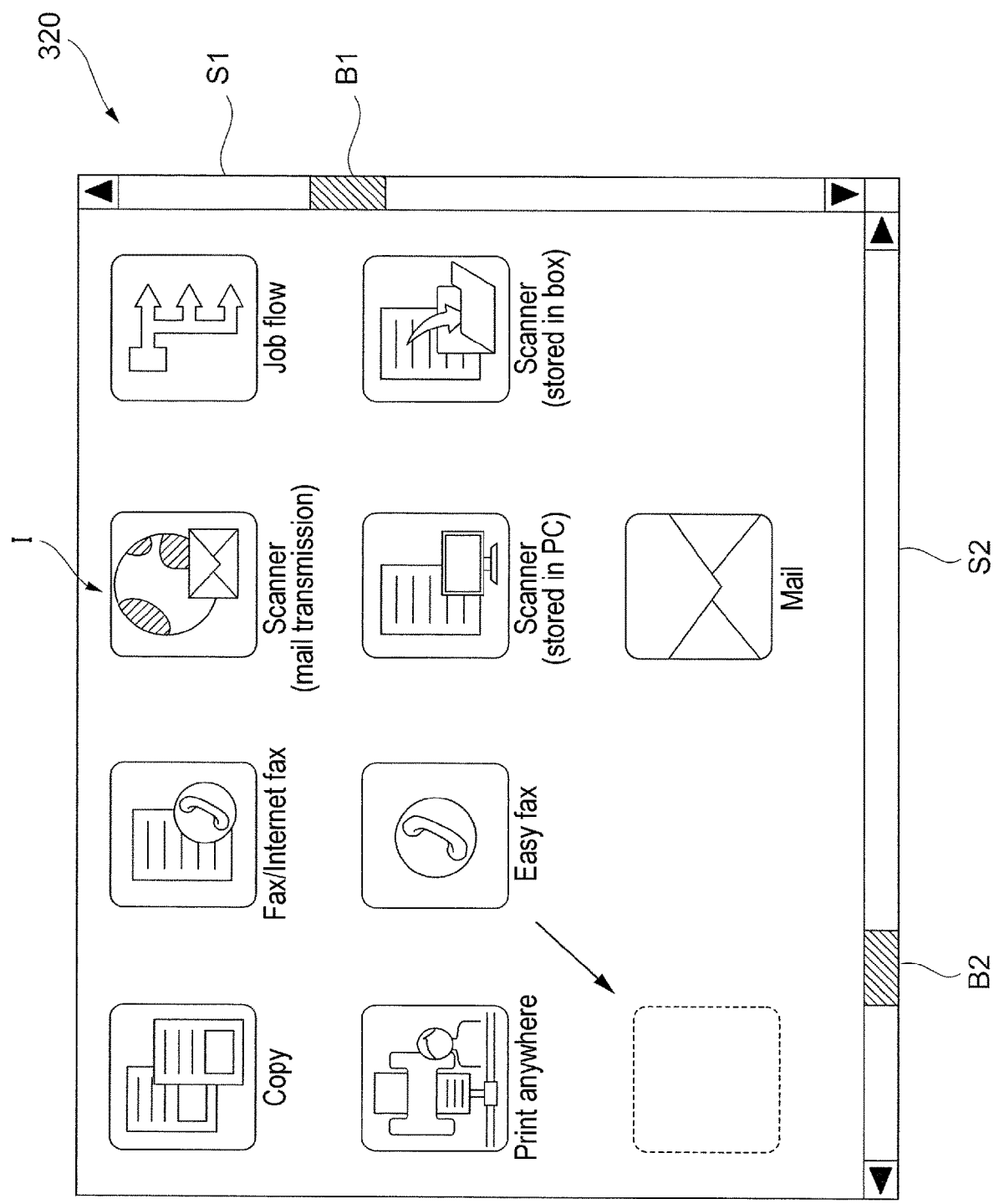
FIG. 5 is a diagram illustrating concrete, exemplary user operations performed on a display.

FIG. 5 is a diagram illustrating concrete, exemplary user operations performed on the display 320.

In this example, a list of icons I for performing functions provided for the image forming apparatus 1 is displayed on the display 320 as an image. The image indicates a so-called home screen. The icons I displayed in the image are associated with predetermined processes. By selecting one of the icons I, the corresponding process is performed.

In the example illustrated in FIG. 5, icons I indicating functions of "Copy", "Fax/Internet fax", "Scanner (mail transmission)", "Job flow", "Print anywhere", "Easy fax", "Scanner (stored in PC)", "Scanner (stored in box)", and "Mail" are displayed on the display 320.

To use a target function, a user touches one of the icons I. When the user touches an icon I, for example, a setting screen corresponding to the function associated with the icons I is displayed. For example, when the "Copy" icon I is touched, a screen in which the number of copies, selection of a sheet to be used, selection of color/monochrome, and scaling up/down are set is displayed as a setting screen for copying a document. After a setting operation, when the user presses a start button described below, an actual copy operation is started.

A user operation of dragging any of the icons I indicates an operation of moving the icon I. For example, when a user wants to move the "Easy fax" icon I to the position indicated by using a dotted line, the user may drag the icon I.

On the display 320, a scroll bar S1 for scrolling the screen in the vertical direction and a scroll bar S2 for scrolling the screen in the horizontal direction are displayed.

In this case, when a user touches an arrow mark provided for the scroll bar S1 or the scroll bar S2, the screen may be scrolled in a direction indicated by the arrow mark. When a user drags a scroll button B1 provided for the scroll bar S1 or a scroll button B2 provided for the scroll bar S2 so as to move the scroll button B1 or the scroll button B2, the screen may be scrolled in a direction in accordance with the movement of the scroll button B1 or the scroll button B2. Scrolling enables an image, which is too large to display in a single screen, to be displayed.

The communication unit 330 communicates with a wireless communication apparatus M that performs near-field wireless communication.

Near-field wireless communication (near field communication (NFC)) is performed using a standard of wireless communication, for example, over a restricted communication range of about 10 cm. In the exemplary embodiment, near-field wireless communication refers to general short-distance wireless communication that is wireless communication over a short range, and any standard may be used.

The wireless communication apparatus M is not limited to a specific apparatus as long as wireless communication using NFC may be performed. For example, the wireless communication apparatus M is a terminal apparatus, such as a smartphone or a tablet.

When a user presents the wireless communication apparatus M to the communication unit 330 or touches the communication unit 330 with the wireless communication apparatus M, NFC communication is automatically performed between the wireless communication apparatus M and the communication unit 330. In FIG. 3A, an exemplary position at which the wireless communication apparatus M is presented is indicated by using a long dashed short dashed line.

Thus, a user stores a processing condition for performing processing on the image forming apparatus 1, such as an image formation condition, in advance in the wireless communication apparatus M. Through NFC communication, the processing condition may be input via the communication unit 330.

It is desirable that the display 320 be disposed close to the communication unit 330 in terms of user operability.

However, when a user presents the wireless communication apparatus M to the communication unit 330 disposed close to the display 320, the wireless communication apparatus M may come into contact with the display 320. As a result, it is determined that, for example, the user touches any of the icons I. This causes an operation of the image forming apparatus 1 which is different from an operation of the image forming apparatus 1 caused by communication between the wireless communication apparatus M and the image forming apparatus 1 to be performed.

Therefore, in the first exemplary embodiment, as illustrated in FIG. 3A, the light detecting unit 310 is disposed between the display 320 and the communication unit 330. Thus, the protrusion portion 310a is disposed between the display 320 and the communication unit 330.

In the configuration in which the protrusion portion 310a of the light detecting unit 310 is disposed, when a user presents the wireless communication apparatus M to the communication unit 330, the wireless communication apparatus M easily comes into contact with the protrusion portion 310a before the wireless communication apparatus M comes into contact with the display 320. Therefore, it is difficult for the wireless communication apparatus M to come into contact with the display 320, and it is difficult for the light detecting unit 310 to detect the wireless communication apparatus M. As a result, it is difficult to cause an operation of the image forming apparatus 1 which is different from an operation of the image forming apparatus 1 caused by communication between the wireless communication apparatus M and the image forming apparatus 1.

Second Exemplary Embodiment

A second exemplary embodiment will be described.

Figure 6A:
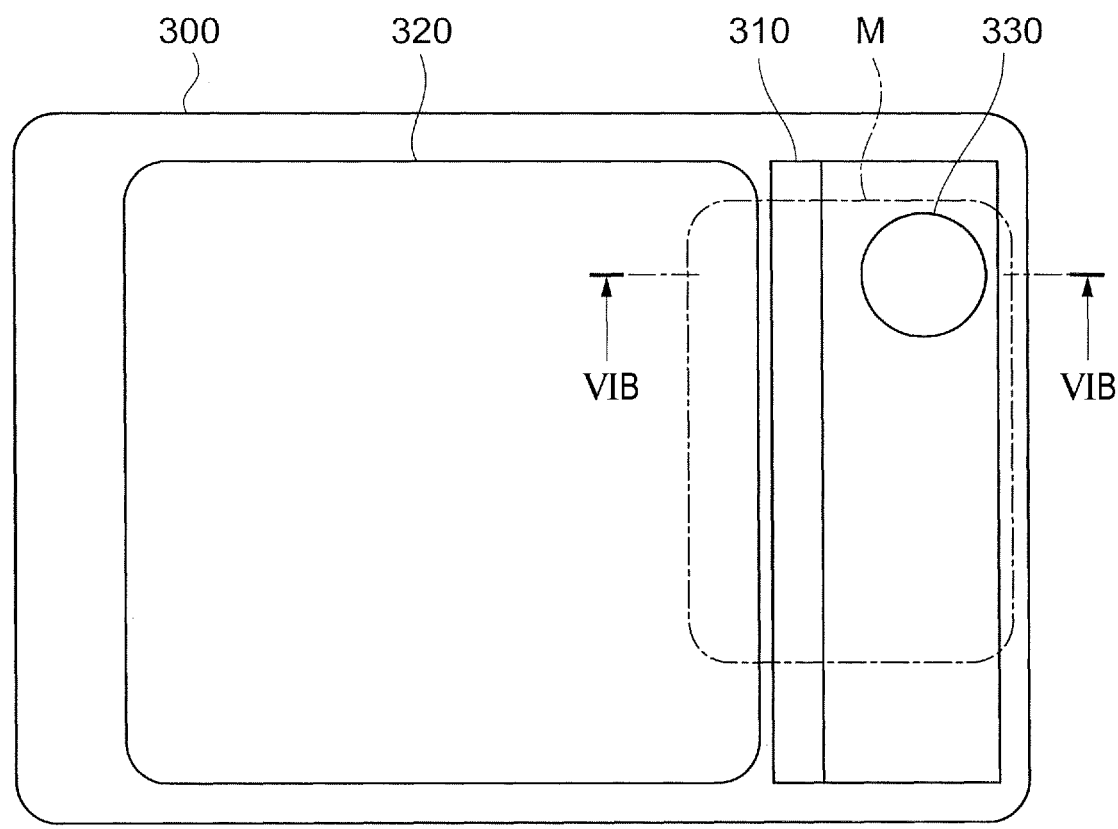
FIG. 6A is a diagram illustrating a user interface according to a second exemplary embodiment.
Figure 6B:
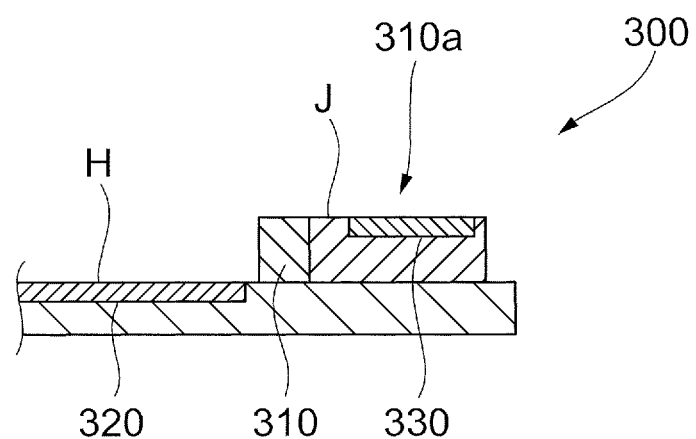
FIG. 6B is a VIB-VIB sectional view of the user interface illustrated in FIG. 6A.

FIG. 6A is a diagram illustrating a user interface 300 according to the second exemplary embodiment. FIG. 6B is a VIB-VIB sectional view of the user interface 300 illustrated in FIG. 6A.

Similarly to the user interface 300 illustrated in FIG. 3A, the user interface 300 illustrated in FIG. 6A includes the light detecting unit 310, the display 320, and the communication unit 330. Both of the arrangements of the light detecting unit 310, the display 320, and the communication unit 330 which are viewed from above are same.

When the user interface 300 in FIG. 6B is compared with that in FIG. 3B, the protrusion portion 310a provided for the light detecting unit 310 is formed so as to extend from between the display 320 and the communication unit 330 to the position of the communication unit 330. That is, the protrusion portion 310a provided for the light detecting unit 310 is positioned between the display 320 and the communication unit 330 as illustrated in FIG. 3B. However, the protrusion portion 310a further extends so as to be provided also at the position of the communication unit 330. In this example, the top surface J of the protrusion portion 310a is parallel to a surface H on which the display 320 is provided. The word "parallel" is not limited to the case of being strictly parallel, and may encompass a case of being substantially parallel.

Thus, when a user is to present the wireless communication apparatus M to the communication unit 330, a user presents the wireless communication apparatus M toward the top surface J of the protrusion portion 310a. In this case, the distance between the wireless communication apparatus M and the display 320 is much longer than that in the case in FIG. 3B. As a result, when a user presents the wireless communication apparatus M to the communication unit 330, it is more difficult for the wireless communication apparatus M to come into contact with the display 320.

Third Exemplary Embodiment

A third exemplary embodiment will be described.

Figure 7A:
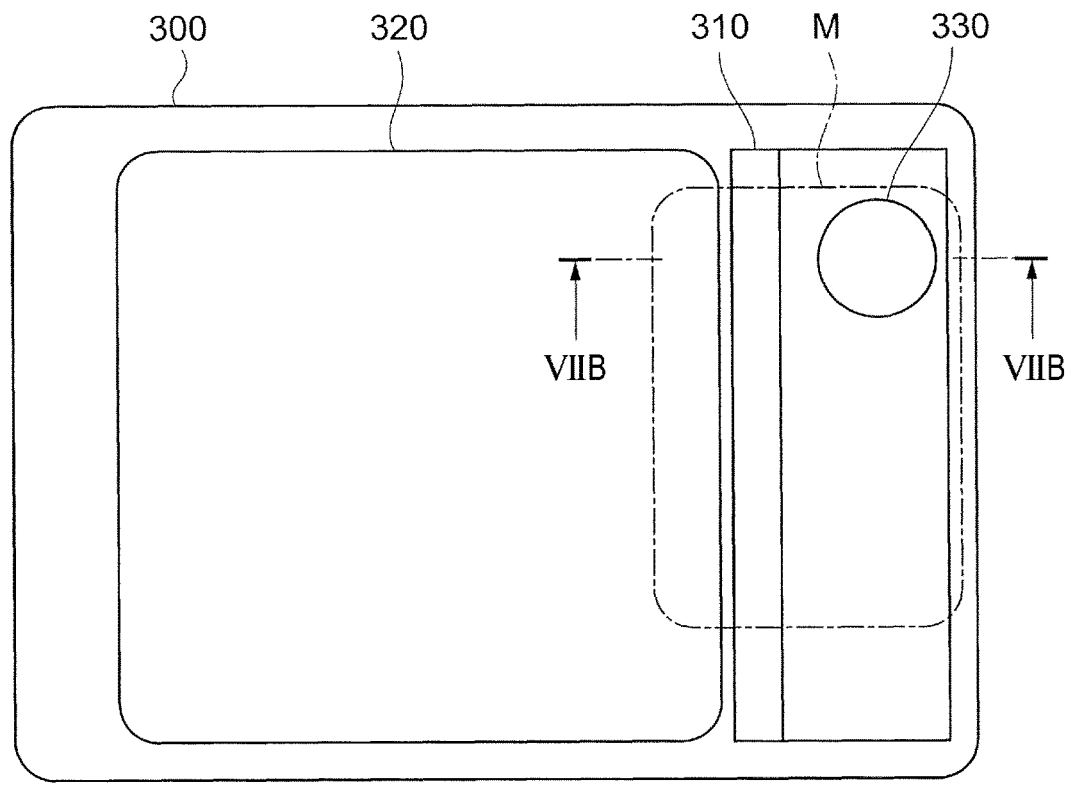
FIG. 7A is a diagram illustrating a user interface according to a third exemplary embodiment.
Figure 7B:
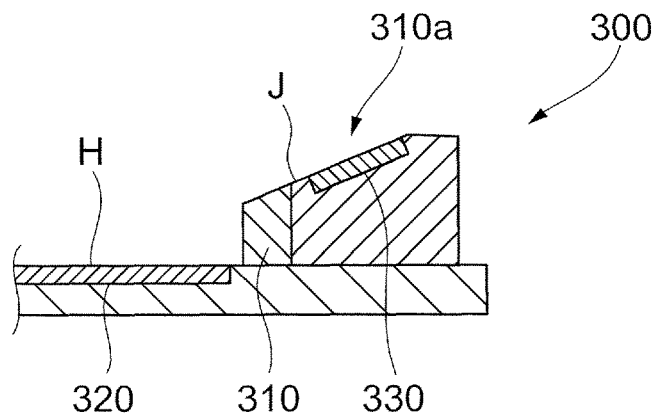
FIG. 7B is a VIIB-VIIB sectional view of the user interface illustrated in FIG. 7A.
Figure 7C:
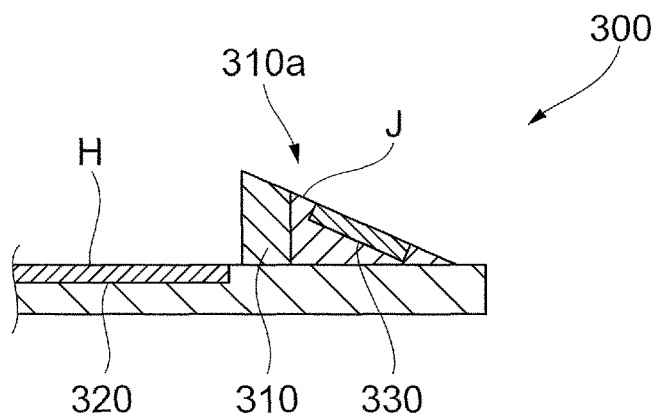
FIG. 7C is another exemplary VIIB-VIIB sectional view of the user interface illustrated in FIG. 7A.

FIG. 7A is a diagram illustrating a user interface 300 according to the third exemplary embodiment. FIG. 7B is a VIIB-VIIB sectional view of the user interface 300 illustrated in FIG. 7A. FIG. 7C illustrates another exemplary VIIB-VIIB sectional view of the user interface 300 illustrated in FIG. 7A.

Similarly to the user interface 300 illustrated in FIG. 6A, the user interface 300 illustrated in FIG. 7A includes the light detecting unit 310, the display 320, and the communication unit 330. Both of the arrangements of the light detecting unit 310, the display 320, and the communication unit 330 which are viewed from above are same.

When FIG. 7B is compared with FIG. 6B, the protrusion portion 310a in FIGS. 6B and 7B is formed so as to extend from between the display 320 and the communication unit 330 to the position of the communication unit 330.

In contrast, as illustrated in FIG. 7B, the user interface 300 according to the third exemplary embodiment is different from that in FIG. 6B in that the protrusion portion 310a formed so as to extend to the position of the communication unit 330 has an oblique surface that inclines toward the display 320 side with respect to the surface H on which the display 320 is provided. That is, the top surface J of the protrusion portion 310a at the position of the communication unit 330 is an oblique surface that inclines toward the display 320 side.

When the user interface 300 illustrated in FIG. 7C is compared with that in FIG. 6B, the protrusion portion 310a has an oblique surface that inclines toward the opposite side to the display 320 side with respect to the surface H on which the display 320 is provided. That is, the top surface J of the protrusion portion 310a at the position of the communication unit 330 is an oblique surface that inclines toward the opposite side to the display 320 side.

This structure in which the top surface J of the protrusion portion 310a at the position of the communication unit 330 is an oblique surface causes a user to present the wireless communication apparatus M toward the oblique surface when the user is to present the wireless communication apparatus M to the communication unit 330. Therefore, it is more difficult for the wireless communication apparatus M to come into contact with the display 320.

Fourth Exemplary Embodiment

A fourth exemplary embodiment will be described.

Figure 8A:
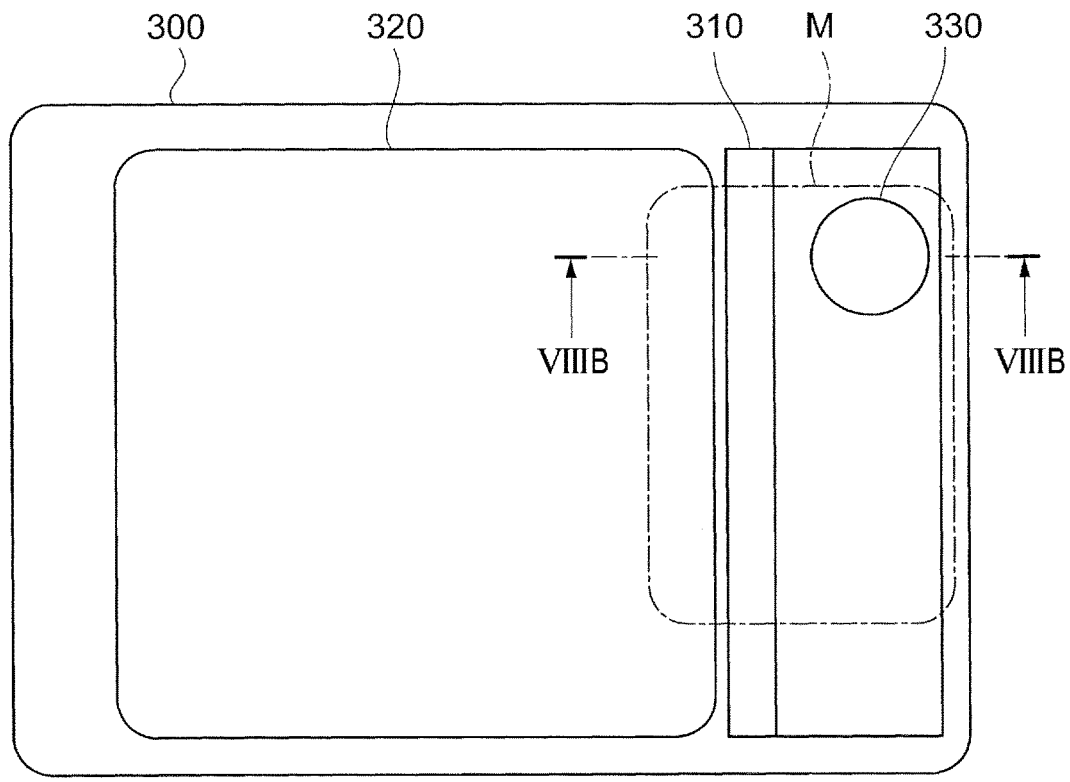
FIG. 8A is a diagram illustrating a user interface according to a fourth exemplary embodiment.
Figure 8B:
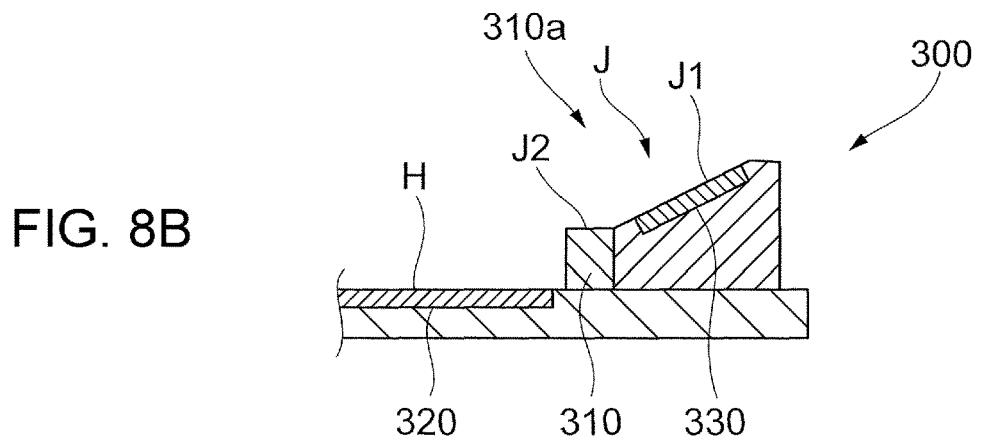
FIG. 8B is an VIIIB-VIIIB sectional view of the user interface illustrated in FIG. 8A.
Figure 8C:
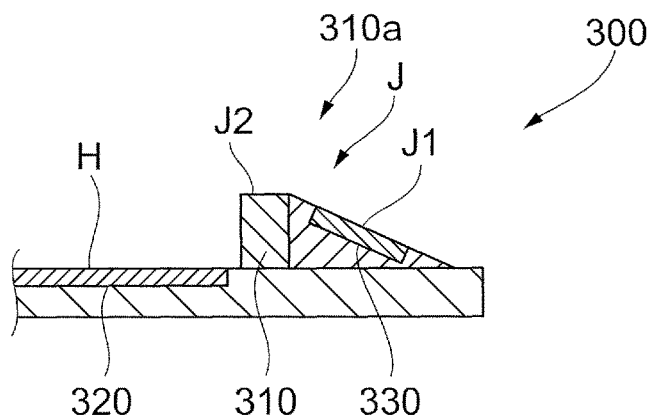
FIG. 8C is another exemplary VIIIB-VIIIB sectional view of the user interface illustrated in FIG. 8A.

FIG. 8A is a diagram illustrating a user interface 300 according to the fourth exemplary embodiment. FIG. 8B is an VIIIB-VIIIB sectional view of the user interface 300 illustrated in FIG. 8A. FIG. 8C illustrates another exemplary VIIIB-VIIIB sectional view of the user interface 300 illustrated in FIG. 8A.

Similarly to the user interface 300 illustrated in FIG. 7A, the user interface 300 illustrated in FIG. 8A includes the light detecting unit 310, the display 320, and the communication unit 330. Both of the arrangements of the light detecting unit 310, the display 320, and the communication unit 330 which are viewed from above are same.

When FIG. 8B is compared with FIG. 7B, the protrusion portion 310a in FIGS. 7B and 8B is formed so as to extend from between the display 320 and the communication unit 330 to the position of the communication unit 330. Further, the protrusion portion 310a formed so as to extend to the position of the communication unit 330 has an oblique surface that inclines toward the display 320 side with respect to the surface H on which the display 320 is provided.

However, in FIG. 7B, the oblique surface is formed so as to cover the entire region extending from between the display 320 and the communication unit 330 to the position of the communication unit 330. In contrast, in FIG. 8B, the oblique surface is formed on a top surface J1 which is a portion of the top surface J of the protrusion portion 310a. The top surface J1 is provided at the position of the communication unit 330. In addition, a parallel surface to the surface H on which the display 320 is provided is disposed between the display 320 and the oblique surface. The parallel surface is a portion of the top surface J of the protrusion portion 310a, and is formed on a top surface J2 provided between the display 320 and the top surface J1 (at the position of the communication unit 330).

The user interface 300 illustrated in FIG. 8C indicates the case in which the protrusion portion 310a has an oblique surface that inclines toward the opposite side to the display 320 side with respect to the surface H on which the display 320 is provided. In this case, the oblique surface is also formed on the top surface J1 that is a portion of the top surface J of the protrusion portion 310a. The top surface J1 is provided at the position of the communication unit 330. A parallel surface to the surface H on which the display 320 is provided is disposed between the display 320 and the oblique surface. The parallel surface is a portion of the top surface J of the protrusion portion 310*a*, and is formed on the top surface J2 between the display 320 and the top surface J1 (at the position of the communication unit 330).

Similarly to the case described in FIGS. 7A to 7C, in the case in FIGS. 8A to 8C, a user presents the wireless communication apparatus M toward the oblique surface when the user is to present the wireless communication apparatus M to the communication unit 330. Therefore, it is more difficult for the wireless communication apparatus M to come into contact with the display 320.

Fifth Exemplary Embodiment

In the above-described examples, the light detecting unit 310 is disposed between the display 320 and the communication unit 330. However, this is not limiting.

Figure 9A:
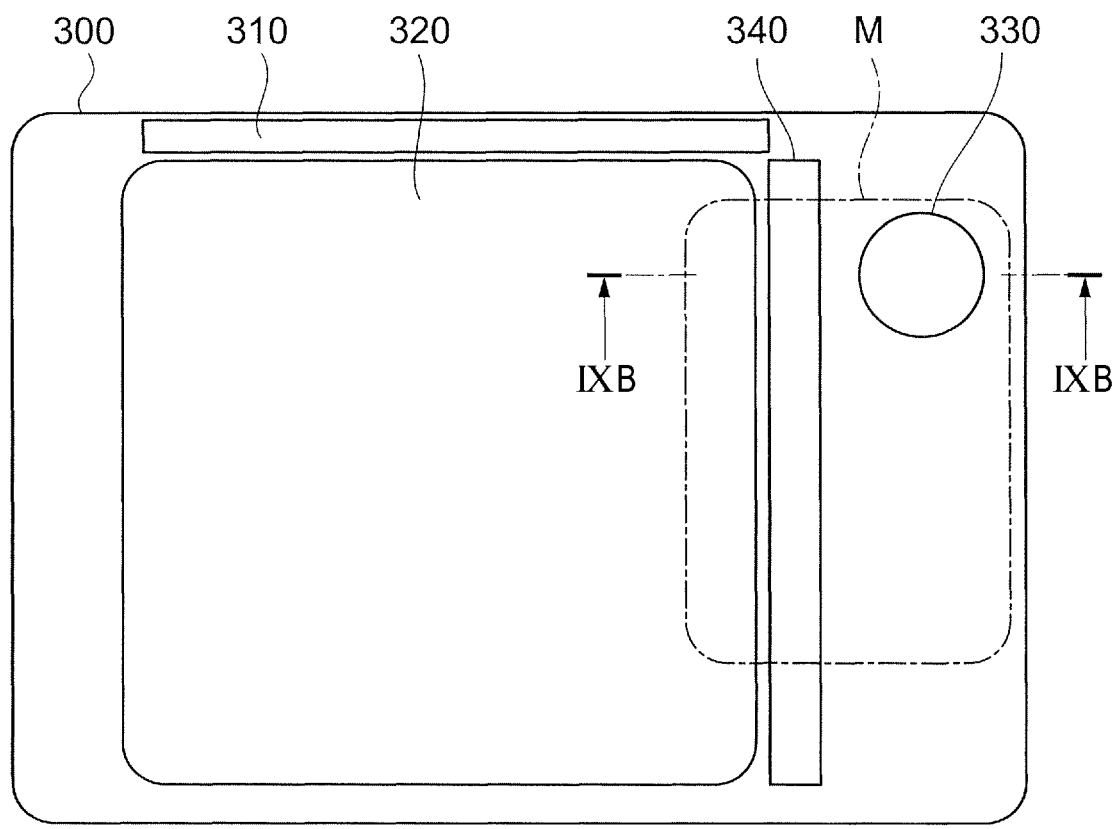
FIG. 9A is a diagram illustrating a user interface according to a fifth exemplary embodiment.
Figure 9B:
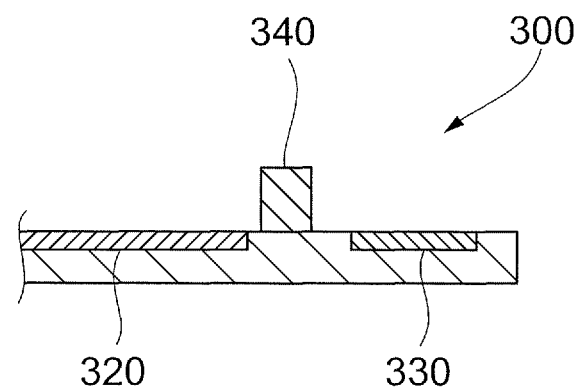
FIG. 9B is a IXB-IXB sectional view of the user interface illustrated in FIG. 9A.

FIG. 9A is a diagram illustrating a user interface 300 according to a fifth exemplary embodiment. FIG. 9B is a IXB-IXB sectional view of the user interface 300 illustrated in FIG. 9A.

Similarly to the user interface 300 illustrated in FIG. 3A, the user interface 300 illustrated in FIG. 9A includes the light detecting unit 310, the display 320, and the communication unit 330.

In the user interface 300 illustrated in FIG. 9A, the light detecting unit 310 is disposed along the top side of the display 320. In FIG. 9A, a protrusion portion 340 is disposed at the position of the light detecting unit 310 in FIG. 3A.

The protrusion portion 340 may have any shape as long as the protrusion portion 340 protrudes from the surface on which the display 320 is provided. For example, the protrusion portion 340 may be provided through molding using resin or the like.

This structure in which the protrusion portion 340 is provided makes the wireless communication apparatus M difficult to come into contact with the display 320 when a user is to present the wireless communication apparatus M to the communication unit 330. Thus, it is difficult for the light detecting unit 310 to detect the wireless communication apparatus M. As a result, it is difficult to cause an operation of the image forming apparatus 1 which is different from an operation of the image forming apparatus 1 caused by communication between the wireless communication apparatus M and the image forming apparatus 1.

Also in the case of the fifth exemplary embodiment, the second to fourth exemplary embodiments may be applied.

Description about the Control Device 500

FIG. 10 is a block diagram illustrating an exemplary functional configuration of the control device 500. FIG. 10 illustrates functions that are related to the present exemplary embodiment and that are selected from among various functions provided for the control device 500.

As illustrated in FIG. 10, the control device 500 according to the present exemplary embodiment includes a detection signal acquiring unit 510, a position detecting unit 520, an operation determination unit 530, a communication reception/transmission unit 540, and an operation controller 550.

The detection signal acquiring unit 510 acquires a detection signal from the light detecting unit 310. The detection signal contains information about the position of a light receiving unit 312 that has received reflected light from a detection target and the intensity of light received by a light receiving unit 312.

The position detecting unit 520 obtains the position of the detection target on the basis of the detection signal acquired by the detection signal acquiring unit 510. As described in FIG. 4, the position may be obtained by using information describing which light receiving unit 312 has detected reflected light, and the intensity of light received by the light receiving unit 312.

The operation determination unit 530 determines a user operation on the basis of the position obtained by the position detecting unit 520. That is, as described above, the operation determination unit 530 determines whether or not, for example, touching, dragging, or swiping has been performed as a user operation on the basis of the position obtained by the position detecting unit 520.

The communication reception/transmission unit 540 receives/transmits information from/to the wireless communication apparatus M through the communication unit 330. Thus, the communication reception/transmission unit 540 may receive a processing condition for performing processing on the image forming apparatus 1, such as an image formation condition. The processing condition includes information for establishing communication from the wireless communication apparatus M (for example, the media access control (MAC) address of the image forming apparatus 1, the Internet protocol (IP) address or the service set identifier (SSID) of the image forming apparatus 1) and image data to be printed.

The operation controller 550 outputs a control signal on the basis of the position of the detection target determined by the position detecting unit 520, the user operation determined by the operation determination unit 530, and the processing condition received by the communication reception/transmission unit 540. Thus, the operation controller 550 controls an operation of the image forming apparatus 1. For example, on the display 320, when it is determined that a user has touched the "Copy" icon I, a screen for setting a copy operation is displayed. The settings for a copy operation are determined on the basis of the processing condition received by the communication reception/transmission unit 540. When it is determined that the user has touched a start button (not illustrated), an actual copy operation is started.

Figure 11:
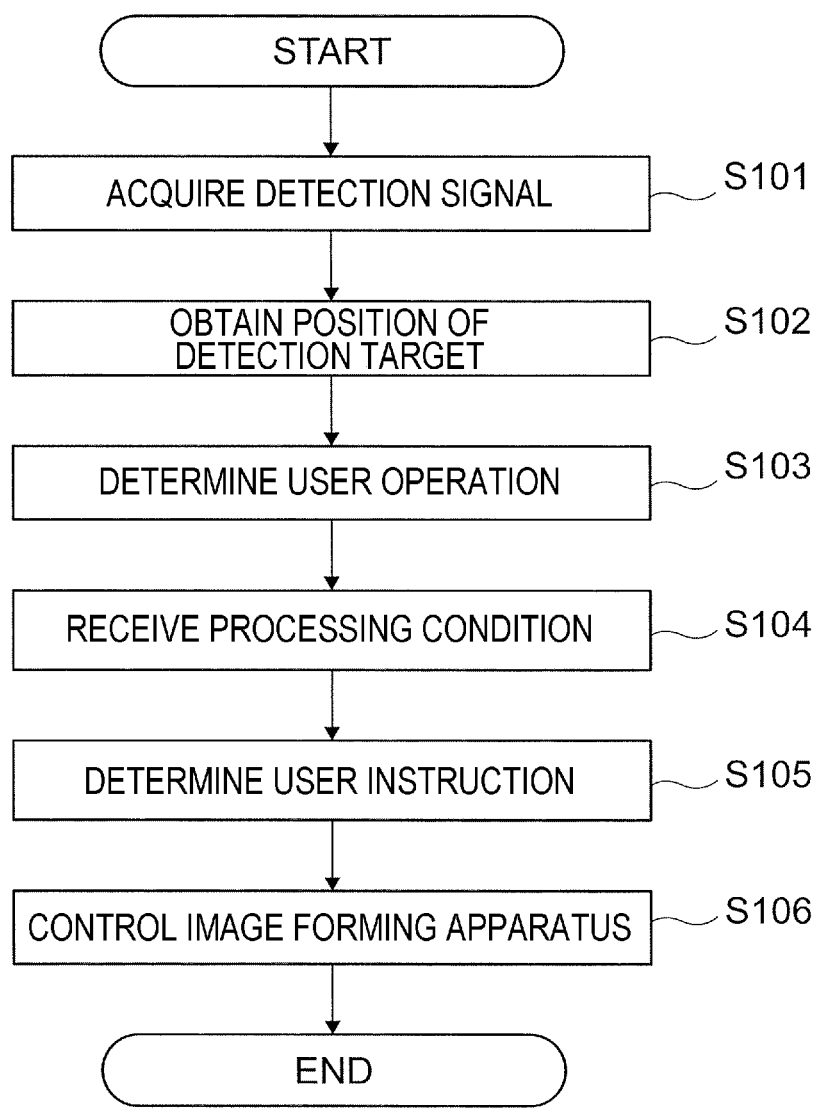
FIG. 11 is a flowchart of an operation performed by the control device.

FIG. 11 is a flowchart of an operation of the control device 500.

First, the detection signal acquiring unit 510 acquires a detection signal from the light detecting unit 310 (step 101).

Then, the position detecting unit 520 obtains the position of a detection target on the basis of the detection signal (step 102).

The operation determination unit 530 determines a user operation on the basis of the position obtained by the position detecting unit 520 (step 103).

The communication reception/transmission unit 540 receives/transmits information from/to the wireless communication apparatus M through the communication unit 330, and receives a processing condition for performing processing on the image forming apparatus 1 (step 104).

The operation controller 550 determines the instruction that is input by the user, on the basis of the position of the detection target which is determined by the position detecting unit 520, the user operation determined by the operation determination unit 530, and the processing condition received by the communication reception/transmission unit 540 (step 105).

The operation controller 550 controls an operation of the image forming apparatus 1 in accordance with the instruction that is input by the user (step 106).

In the above-described examples, description is made by taking the image forming apparatus 1 as an example. However, this is not limiting. The above-described embodiments may be applied to any apparatus as long as the apparatus uses the light detecting unit 310 and the communication unit 330.

In the above-described examples, the light detecting unit 310 detects a detection target such as a user's finger. Alternatively, without the light detecting unit 310, a touch panel may be used as the display 320.

The touch panel is a combination of a display such as a liquid crystal panel and a position detecting unit. When a detection target T such as a user's finger comes into contact with the display, the position detecting unit detects the position at which the detection target T comes into contact with the display. Thus, the user may operate the apparatus by touching a screen displayed on the display. The touch panel is not particularly limited. Various types of touch panels, such as a resistance film touch panel or an electrostatic capacitance touch panel, may be used.

Even when a touch panel is used as the display 320, the wireless communication apparatus M may come into contact with the touch panel. This may cause an operation of the image forming apparatus 1 which is different from an operation of the image forming apparatus 1 caused by communication between the wireless communication apparatus M and the image forming apparatus 1. Therefore, a protrusion portion is provided between the display 320 and the communication unit 330. Thus, it is difficult for the wireless communication apparatus M to come into contact with the display 320 when a user presents the wireless communication apparatus M to the communication unit 330. This makes the wireless communication apparatus M difficult to detect. As a result, it is difficult to cause an operation of the image forming apparatus 1 which is different from an operation of the image forming apparatus 1 caused by communication between the wireless communication apparatus M and the image forming apparatus 1. When an electrostatic capacitance touch panel is used, it is difficult to detect the wireless communication apparatus M that is present on the display 320. When a resistance film touch panel is used, it is easier to detect the wireless communication apparatus M. Therefore, the exemplary embodiments are effective especially for a case in which the display 320 is a resistance film touch panel.

When a touch panel is used as the display 320, the light detecting unit 310 is not necessary. Therefore, in the first to fourth exemplary embodiments, the protrusion portion 340 according to the fifth exemplary embodiment is disposed as a protrusion portion instead of the protrusion portion 310a of the light detecting unit 310.

In the above-described examples, the image forming apparatus 1 may be interpreted as a detection apparatus including the light detecting unit 310 and the control device 500. The functions of the control device 500 may be included in the light detecting unit 310 and the user interface 300. In this case, the light detecting unit 310 and the user interface 300 serve as a detection apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A receiving device comprising:
   a display that displays an image and that receives an operation corresponding to the image when a user comes into contact with a surface of the display;
   a transceiver that communicates with a wireless communication apparatus performing near-field wireless communication; and
   a protrusion portion that protrudes with respect to the surface of the display, the protrusion portion being disposed at least between the display and transceiver, and extending to at least the transceiver,
   wherein the transceiver is positioned at a top surface of the protrusion portion.

2. A receiving device comprising:
   a display that displays an image and that receives an operation corresponding to the image when a user comes into contact with a surface of the display;
   a transceiver that communicates with a wireless communication apparatus performing near-field wireless communication; and
   a protrusion portion that is disposed at least between the display and the transceiver, and extends at least to the transceiver, wherein the transceiver is positioned at a top surface of the protrusion portion and the protrusion portion is configured such that when the communication apparatus is presented to the transceiver to communicate with the transceiver, the communication apparatus does not contact the surface of the display.

3. The receiving device according to claim 1,
   wherein the top surface of the protrusion portion includes an oblique surface that inclines toward a display side or an opposite side to the display side with respect to the surface of the display.

4. The receiving device according to claim 3,
   wherein the top surface of the protrusion portion includes a parallel surface that is parallel to the surface of the display, the parallel surface being disposed between the display and the oblique surface.

5. The receiving device according to claim 1,
   wherein the protrusion portion is a light detecting unit that detects a position of a detection target on or above the display in such a manner that a light receiving unit receives reflected light produced when light emitted from a light emitting unit is reflected from the detection target.

6. The receiving device according to claim 5,
   wherein the display is rectangular, and the light detecting unit is disposed along one side of the display.

7. An image forming apparatus comprising:
   a display that displays an image and that receives an operation corresponding to the image when a user comes into contact with a surface of the display;
   a transceiver that communicates with a wireless communication apparatus performing near-field wireless communication; and
   a protrusion portion that protrudes with respect to the surface of the display, the protrusion portion being disposed at least between the display and transceiver, and extending to at least the transceiver,
   wherein the transceiver is positioned at a top surface of the protrusion portion.

8. The receiving device according to claim 1, wherein the entire transceiver is positioned above a plane that is defined by the surface of the display.

9. The receiving device according to claim 2, wherein the entire transceiver is positioned above a plane that is defined by the surface of the display.

10. The image forming apparatus according to claim 7, wherein the entire transceiver is positioned above a plane that corresponds to the surface of the display.

11. The receiving device according to claim 3, wherein the transceiver is positioned at the oblique surface of the top surface.

12. The receiving device according to claim 4, wherein the transceiver is positioned at the oblique surface of the top surface.

13. The receiving device according to claim 1, wherein the protrusion portion projects outwardly of a plane defined by the surface of the display to the top surface.

14. The receiving device according to claim 2, wherein the protrusion portion projects outwardly of a plane defined by the surface of the display to the top surface.

15. The image forming apparatus according to claim 7, wherein the protrusion portion projects outwardly of a plane defined by the surface of the display to the top surface.

\* \* \* \* \*